April 22, 1947. J. P. MONTGOMERY ET AL 2,419,364
CABLE HANGER
Filed Oct. 25, 1945
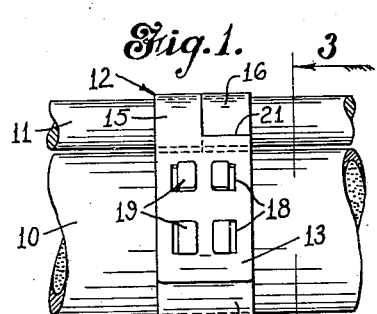
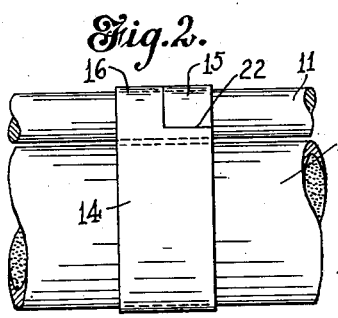
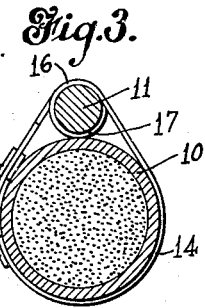
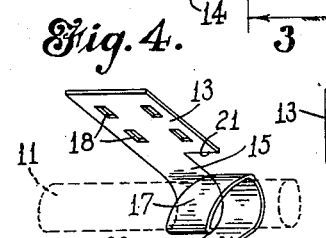
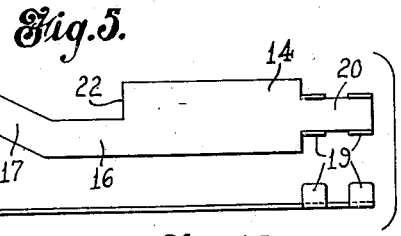
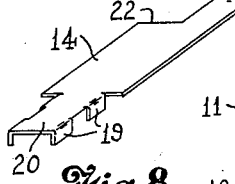
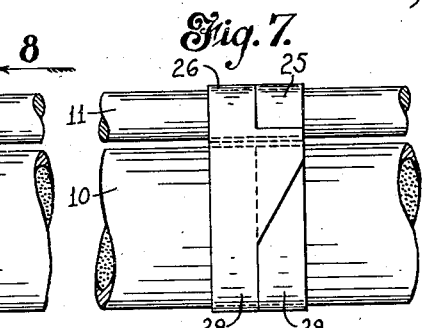
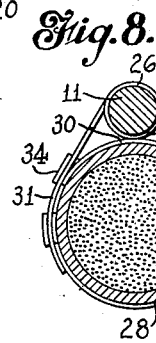
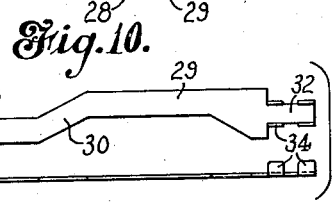
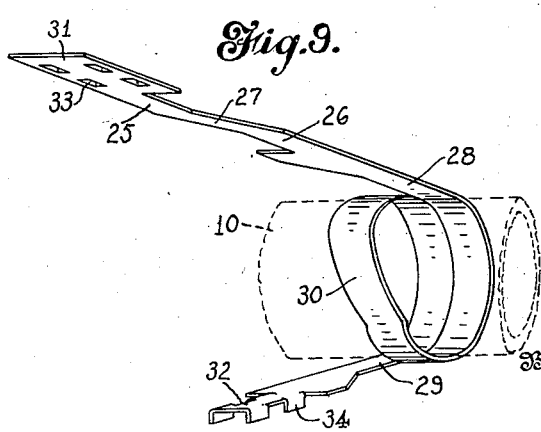
Inventors
John P. Montgomery
and Frode H. Pierson
By Rockwell + Bartholow
Attorneys Patented Apr. 22, 1947

2,419,364

UNITED STATES PATENT OFFICE 2,419,364

CABLE HANGER

John P. Montgomery, Mount Carmel, and Frode H. Pierson, Orange, Conn., assignors to The West Haven Buckle Company, West Haven, Conn., a corporation of Connecticut Application October 25, 1945, Serial No. 624,472

5 Claims. (Cl. 248—61)

This invention relates to cable hangers or supports, and more particularly to means for supporting or suspending a relatively heavy cable in such a manner as to prevent swinging or whipping of the cable in the wind, and to prevent the sagging of the cable from the supporting wire to which it is secured.

In suspending current-carrying cables, either high-power cables such as used in transmission lines, or telephone cables, for example, it is the custom to stretch a supporting wire, commonly called a messenger wire, between two adjacent poles and suspend the current-carrying cables from this messenger wire by the use of attaching or anchoring clips or hangers secured at spaced points along the messenger wire and cable.

If, as is sometimes the practice, the cable is supported at some distance below the messenger wire, there is a tendency for the cable, which is quite heavy, to swing or whip in the wind, which will either loosen the hangers or will cause them to break, due to continual bending, thus necessitating repair work to hold the cable in place. Moreover, these cables are commonly handled by being wound upon reels, and it is advantageous to be able to wind the cable and messenger wire together with the hangers or clips securing the two elements together on the reel as a unit, that is, wind them on the reel with the clips or hangers secured thereto in their final positions so it will only be necessary to string the cable and messenger wire upon the poles when an installation is made. In order that this may be effectively accomplished, it is necessary that the hangers or clips be compact and that they lie closely at all portions to the messenger wire and cable, so that there will be no projections to interfere with the coiling of the cable upon a spool or reel.

We contemplate by the present invention to provide a cable hanger formed of sheet metal and so constructed that it may be employed to bind the cable tightly and securely to the messenger wire, so that there will be no danger of slippage between the hanger and the two elements with which it is used, and, at the same time, the hanger is so constructed that it will lie flatly against the cable and messenger wire and will, therefore, not interfere with the winding or coiling of the cable and messenger wire upon the reel. Moreover, the hanger is so constructed that it may very readily be applied to the cable and messenger wire by merely wrapping it around these two elements without having to thread one part of the hanger strip through the other, and is so arranged that the weight of the cable upon the hanger will tend to cause it to grip the messenger wire more securely.

One object of the invention is to provide a new and improved cable hanger or clip for securing a cable to a supporting or messenger wire.

A further object of the invention is to provide a novel sheet metal cable hanger or clip which may be readily applied to the cable and messenger wire and which will lie closely and compactly against these two elements so as not to interfere with the winding or reeling of the cable and wire upon a spool.

A still further object of the invention is to provide a novel hanger or clip for securing the cable to a supporting or messenger wire such that the material of the hanger will be wrapped around the messenger wire for at least one complete turn and thereafter looped around the cable so that the weight of the cable will tend to cause the hanger to grip the messenger wire more tightly.

To these and other ends the invention consists in the novel features and combinations of parts to be hereinafter described and claimed.

In the accompanying drawings:

Fig. 1 is a front elevational view of a portion of the cable and messenger wire, showing the application of our improved hanger;

Fig. 2 is a view similar to Fig. 1, showing the opposite side of the cable;

Fig. 3 is a sectional view on line 3—3 of Fig. 1;

Fig. 4 is a perspective view showing the manner of securing the hanger to the messenger wire;

Fig. 5 comprises plan and side elevational views of the hanger before it is applied to the cable;

Fig. 6 is a view similar to Fig. 1, showing a modified form of our invention;

Fig. 7 is a view of the opposite side of the hanger shown in Fig. 6;

Fig. 8 is a sectional view on line 8—8 of Fig. 6;

Fig. 9 is a perspective view, showing the manner of wrapping the hanger shown in Figs. 6 and 7 about the cable; and Fig. 10 comprises plan and side elevational view of the hanger shown in Figs. 6 and 7.

To illustrate one preferred embodiment of our invention, we have shown in Figs. 1 to 3 of the drawings a cable 10 supported from a messenger wire 11 and bound to this wire by a clip or hanger designated generally by the numeral 12. From Figs. 3 and 4 of the drawings, it will be seen that the material of the hanger is wrapped around the messenger wire approximately one and one-half turns, so that one thickness of the material of the hanger lies between the messenger wire and the cable. The remainder of the length of the clip is looped about the cable and the ends secured together as will be hereinafter explained, so that the cable is secured closely and firmly to the messenger wire without leaving any freedom for swinging or whipping.

The clip is shown in extended form in Fig. 5 and consists generally of a strip of readily flexible or bendable sheet metal, comprising relatively wide end portions 13 and 14. These end portions are connected together by a portion of narrower width, this connecting part comprising laterally offset portions 15 and 16 connected by a diagonal or spiral portion 17.

The end portion 13 is somewhat shorter than the portion 14 and may be provided with openings 18 adapted to receive therein, when the hanger is applied to the cable, tongues or tabs 19 struck or turned at right angles to the body of a relatively narrow end portion 20 which projects from the portion 14. It will be understood that as is shown in Fig. 1, these tabs or tongues 19 after being inserted through the openings 18 are bent over to lie flatly upon the portion 13, so that, as shown in Fig. 3, there will be no projecting parts to interfere with the winding of the cable and messenger wire upon the reel.

In applying the hanger to a cable, it is first wound about the messenger wire 11 as shown in Fig. 4 for at least one complete turn and, as both of the wide ends 13 and 14 will extend downwardly from the messenger wire, this winding will comprise slightly more than one turn, or approximately one and one-half turns. This winding is comprised almost altogether of the narrow portions of the cable 15, 16 and 17 and, as will be seen from Fig. 4, the diagonal or spiral portion 17 will enable the winding of the flat body of the hanger in a substantially spiral arrangement upon the messenger wire, so that the parts will not overlap, but the parts 15 and 16 will be spaced laterally from each other by the part 17. Moreover, the cut-out portions of the hanger adjacent the shoulders 21 and 22 permit the ready wrapping of the cable around the wire as the parts 15 and 16 will readily pass each other when the wrapping is effected.

After the hanger has been wrapped around the messenger wire 11, as shown in Fig. 4, for at least one complete turn, the ends are turned downwardly and the longer end 14 is brought around the cable 10 as shown in Figs. 1 to 3. The narrow end portion 20 is then brought upwardly below the portion 13 and the tongues 19 inserted through the openings 18, so that the only overlapping portions of the hanger consist of the portions 13 and 20. The cable will now be secured tightly against the messenger wire and the tongues may be turned or clinched against the end portion 13 as shown in Fig. 1 to complete the connection. It will be seen from Figs. 1 to 3 that in its final position, the part 13, which will depend downwardly from the messenger wire, will overlie the part 20 which extends upwardly so as to prevent the entrance of water between these two elements.

It will be apparent that as the portions 15, 16 and 17 of the hanger are wrapped about the messenger wire, the hanger will not tend to oscillate about the wire even under tendency of the cable to shift or swing, due to wind pressure, and that the hanger will be so bound upon the messenger wire so that it will not slide longitudinally and allow the cable to sag between two adjacent hangers, so that the cable will be bound tightly against the wire at all times. Also, the weight of the cable tends to pull downwardly upon the members 13 and 14 so as to cause the messenger wire to be effectively gripped by the coiled portion of the hanger, and that the greater the weight the more effective will be the binding action.

In Figs. 6 to 10 of the drawings, we have shown a modified form of our invention in which the hanger is so constructed that it may not only be wound about the messenger wire, but it may also be given a complete turn about the cable itself so that it will be effectively locked not only to the messenger wire but also to the cable.

In this form of our invention, the hanger, as shown in Fig. 10, comprises laterally offset portions 25 and 26 joined by a diagonal portion 27 and also laterally offset portions 28 and 29 joined by a diagonal portion 30, together with the end portions 31 and 32 which are provided with slots 33 and bendable tongues 34, respectively, for securing the two ends of the hanger together.

As shown in Figs. 6, 7 and 8, this hanger is wound about the messenger wire 11 as already explained in connection with the invention illustrated in Figs. 1 to 5, the parts 25, 26 and 27 serving to embrace this wire to make substantially one and one-half complete turns about the messenger wire. Thereafter the remainder of the body portion of the hanger consisting of the parts 28, 29 and 30 are given substantially one and one-half turns about the cable 10, as shown in Fig. 9, and as already explained the diagonally or spirally directed portion 30 will enable this winding to be done without overlapping of the parts 28 and 29 and with these parts lying flatly against the cable. After these parts of the hanger have been given a complete turn about the cable, the two end portions 32 and 33 are brought together as shown in Fig. 8 with the part 32 lying below the part 33 and the tongues 34 are inserted through the openings 33 and clinched over to secure the parts in position.

In this form of our invention, the hanger will be locked not only to the messenger wire but also to the cable, and the weight of the cable will, in this instance, also tend to cause a binding action between the two elements and the hanger, so that there will be no slippage or rotation of the hanger about either of the elements which are secured together. Also, it will be seen that the parts will lie flatly against the cable and the messenger wire so as not to interfere with the coiling of these elements upon a reel or spool, and that due to the shape of the hanger between the end portions 31 and 32, there will be no overlapping of the parts on the messenger wire or cable to increase the bulkiness of the connection. Also, while the hanger or clip may be made very cheaply and economically, it is also extremely effective in operation and durable in use.

While we have shown and described some preferred embodiments of our invention, it will be understood that it is not to be limited to all of the details shown, but is capable of modification and variation within the spirit of the invention and within the scope of the claims.

What we claim is:

1. A cable hanger for securing a cable to a supporting or messenger wire, said hanger comprising a sheet metal strip embracing the messenger wire with at least one full turn, the ends of said strip projecting downwardly from the wire with one end longer than the other, and the longer end being passed below the cable and turned upwardly and secured to the shorter end to secure the cable snugly to the messenger wire whereby the weight of the cable causes the strip to grip the messenger wire.

2. A cable hanger for securing a cable to a supporting or messenger wire, said hanger comprising a sheet metal strip embracing both cable and wire and wound about the latter for more than a full turn, with its ends extending downwardly to embrace the cable whereby the weight of the cable will cause the strip to grip the wire tightly.

3. A cable hanger for securing a cable to a messenger wire, said hanger comprising a single strip of flexible sheet material embracing both wire and cable and binding them closely together, said strip being wound about the messenger wire for more than a full turn whereby the weight of the cable will cause the winding of the strip to grip the messenger wire tightly and prevent relative movement between said wire and hanger.

4. A cable hanger or the like comprising a strip of flexible sheet material, said strip having end portions provided with cooperating fastening elements and a body part between said end portions, said body part comprising two laterally offset and longitudinally spaced portions and a diagonal portion connecting said offset and spaced portions.

5. A cable hanger or the like comprising a strip of flexible sheet material, said strip having end portions provided with cooperating fastening elements and a body part between said end portions, said body part comprising two portions in longitudinal alignment with each other and disposed in longitudinally spaced relation whereby one lies adjacent each end portion of the hanger, an intermediate portion disposed in a laterally offset position with respect to said end portion, and diagonally extending portions connecting said intermediate portion with said longitudinally spaced portions.

JOHN PHELPS MONTGOMERY.
FRODE H. PIERSON.

REFERENCES CITED

The following references are of record in the file of this patent:

FOREIGN PATENTS

| Number | Country | Date |
|---|---|---|
| 261,807 | Italian | Dec. 11, 1928 |